US011966194B2

(12) United States Patent
Mori et al.

(10) Patent No.: US 11,966,194 B2
(45) Date of Patent: Apr. 23, 2024

(54) IMAGE FORMING APPARATUS

(71) Applicant: BROTHER KOGYO KABUSHIKI KAISHA, Nagoya (JP)

(72) Inventors: Kentaro Mori, Kasugai (JP); Ryuji Noda, Toyokawa (JP); Shinya Kusuda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/161,300

(22) Filed: Jan. 30, 2023

(65) Prior Publication Data

US 2023/0244183 A1 Aug. 3, 2023

(30) Foreign Application Priority Data

Jan. 31, 2022 (JP) ................................ 2022-013104

(51) Int. Cl.
*G03G 15/00* (2006.01)
*G03G 21/16* (2006.01)
*G03G 21/18* (2006.01)

(52) U.S. Cl.
CPC ..... *G03G 21/1871* (2013.01); *G03G 21/1647* (2013.01); *G03G 21/1652* (2013.01); *G03G 21/1885* (2013.01); *G03G 2221/1823* (2013.01)

(58) Field of Classification Search
CPC ............... G03G 15/00; G03G 21/1647; G03G 21/1652; G03G 21/1871; G03G 21/1885
USPC .................................. 399/10, 117, 110, 111
See application file for complete search history.

(56) References Cited

U.S. PATENT DOCUMENTS

2021/0311412 A1 10/2021 Kusuda et al.

FOREIGN PATENT DOCUMENTS

JP 2003177650 * 6/2003
JP 2020201318 * 12/2020
JP 2021-162751 A 10/2021

* cited by examiner

*Primary Examiner* — Hoan H Tran
(74) *Attorney, Agent, or Firm* — Merchant & Gould P.C.

(57) ABSTRACT

A memory holder cover holds a memory holder so as to be movable with respect to the memory holder cover. An electrical contact contacts an electrical contact surface of a memory from above in a state where a cartridge is located at an attached position at which the cartridge is attached to a main housing. The main housing includes a guide groove having upper and lower guide surfaces. The upper guide surface guides movement of a memory holder from above when the cartridge is attached and detached. The lower guide surface guides movement of the memory holder from below when the cartridge is attached and detached. In a state where the cartridge is located at the attached position, the electrical contact surface is parallel to at least part of the upper guide surface or at least part of the lower guide surface.

14 Claims, 15 Drawing Sheets

IMAGE FORMING APPARATUS

REFERENCE TO RELATED APPLICATIONS

This application claims priority from Japanese Patent Application No. 2022-013104 filed on Jan. 31, 2022. The entire content of the priority application is incorporated herein by reference.

BACKGROUND ART

A cartridge having a memory is attached to an image forming apparatus.

DESCRIPTION

In a cartridge of an image forming apparatus, a memory is held so as to be movable up and down. During an attaching process of the cartridge, an electrical contact surface of the memory is movable up and down.

However, in the cartridge of the image forming apparatus, if the attaching direction of the cartridge is not parallel to the electrical contact surface of the memory, resistance of attachment and detachment of the cartridge increases when the cartridge is attached and detached.

In view of the foregoing, an example of an object of this disclosure is to suppress attachment and detachment resistance when a cartridge is attached and detached.

According to one aspect, this specification discloses an image forming apparatus. The image forming apparatus includes a main housing, a cartridge, and an electrical contact. The cartridge is configured to be attached to the main housing in an attaching direction. The cartridge includes a memory, a memory holder, and a memory holder cover. The memory has an electrical contact surface and is configured to store information relating to the cartridge. The memory holder holds the memory. The memory holder cover holds the memory holder so as to be movable with respect to the memory holder cover. The electrical contact is configured to contact the electrical contact surface from above in a state where the cartridge is located at an attached position at which the cartridge is attached to the main housing. The main housing includes a guide groove. The guide groove has an upper guide surface and a lower guide surface. The upper guide surface is configured to guide movement of the memory holder from above when the cartridge is attached and detached. The lower guide surface is configured to guide movement of the memory holder from below when the cartridge is attached and detached. In a state where the cartridge is located at the attached position, the electrical contact surface is parallel to at least part of the upper guide surface or at least part of the lower guide surface, which reduces attachment and detachment resistance in a process of attaching and detaching the cartridge.

According to another aspect, this specification also discloses an image forming apparatus to which a cartridge is attachable in an attaching direction. The cartridge includes a memory having an electrical contact surface and configured to store information relating to the cartridge, and a memory holder holding the memory and being movable with respect to the cartridge. The image forming apparatus includes a main housing and an electrical contact. The electrical contact is configured to contact the electrical contact surface from above in a state where the cartridge is located at an attached position at which the cartridge is attached to the main housing. The main housing includes a guide groove. The guide groove has an upper guide surface and a lower guide surface. The upper guide surface is configured to guide movement of the memory holder from above when the cartridge is attached and detached. The lower guide surface is configured to guide movement of the memory holder from below when the cartridge is attached and detached. In a state where the cartridge is located at the attached position, the electrical contact surface is parallel to at least part of the upper guide surface or at least part of the lower guide surface, which reduces attachment and detachment resistance in a process of attaching and detaching the cartridge.

Next, an embodiment of the present disclosure will be described in detail with reference to the drawings as appropriate.

Figure 1:
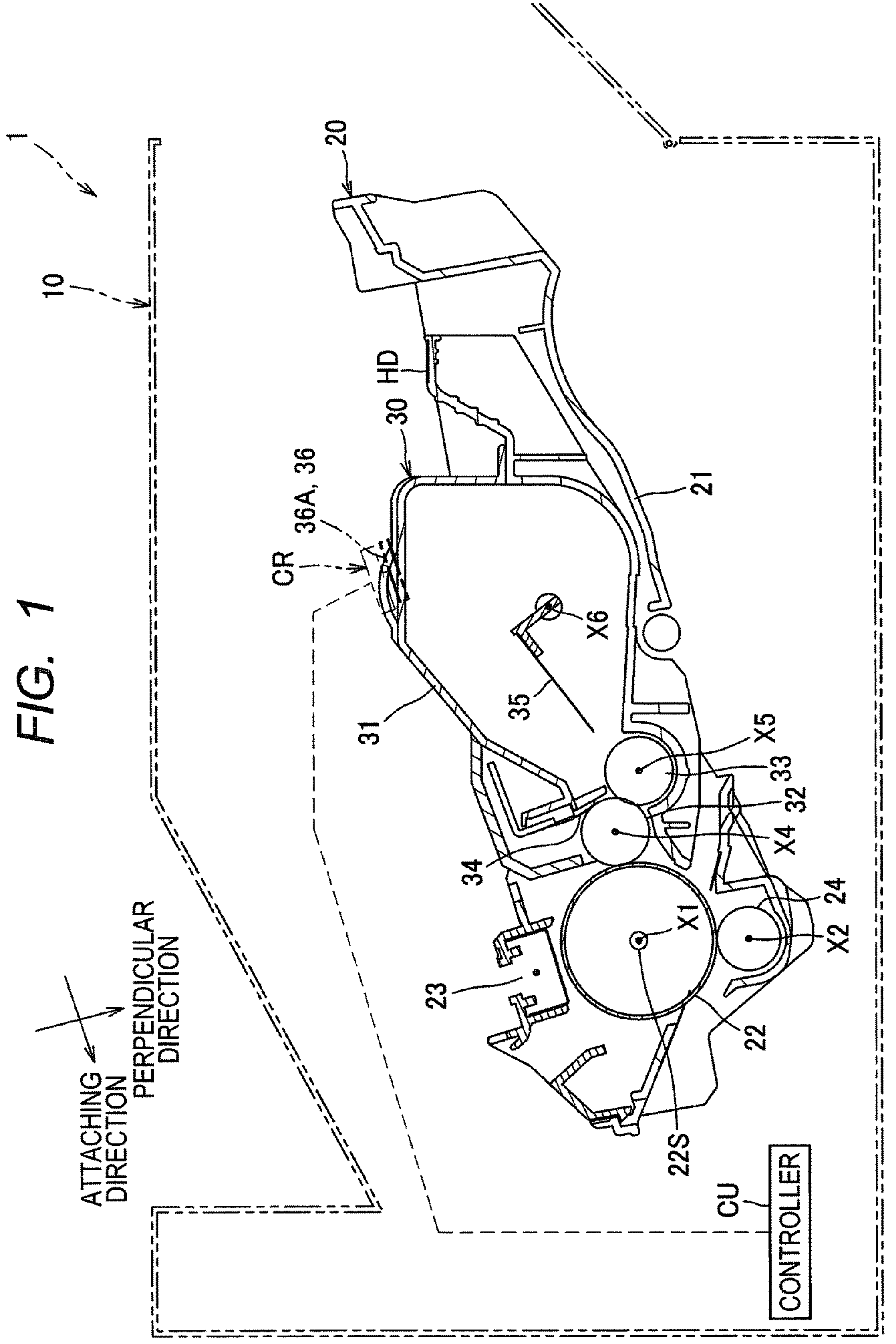
FIG. 1 is a cross-sectional view showing a drum cartridge attached to an image forming apparatus.

An image forming apparatus 1 is a monochrome printer, for example. As shown in FIG. 1, the image forming apparatus 1 includes a main housing 10, a drum cartridge 20, a toner cartridge 30, a controller CU, and an electrical contact CR. The drum cartridge 20 and the toner cartridge 30 are examples of a cartridge.

Figure 2A:
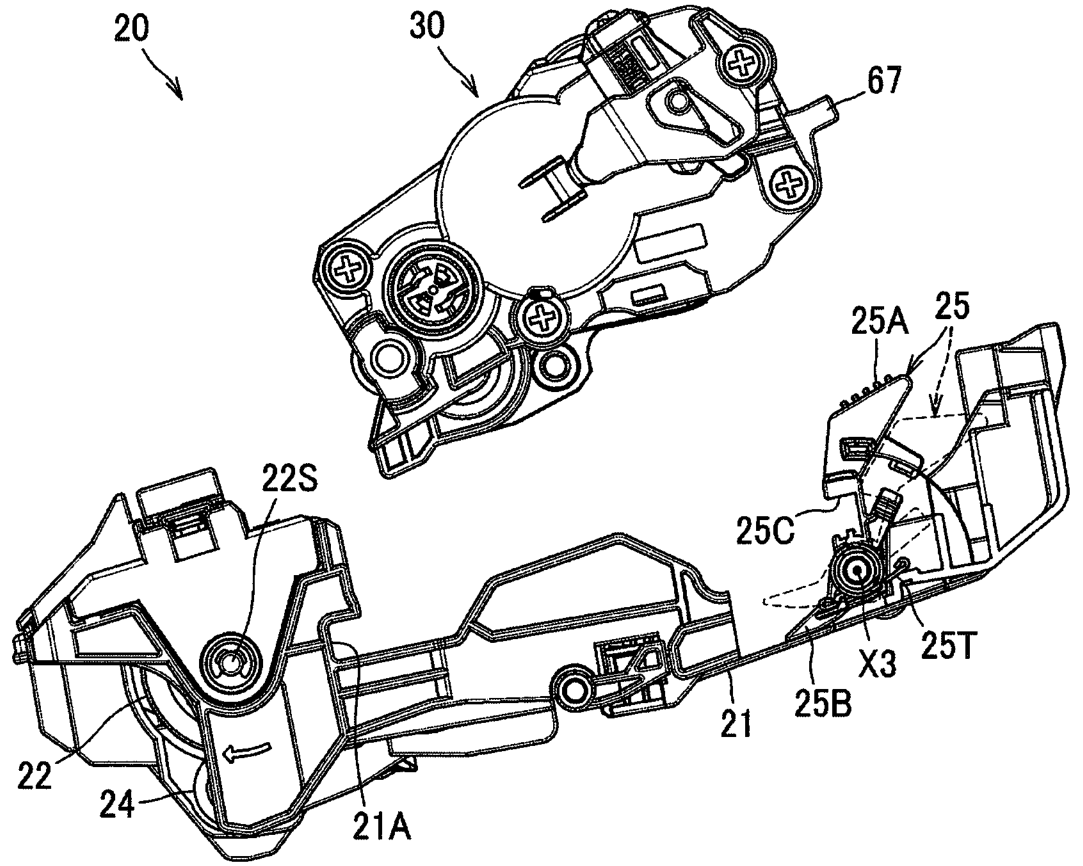
FIG. 2A is a diagram showing a state where a toner cartridge and the drum cartridge are separated.
Figure 2B:
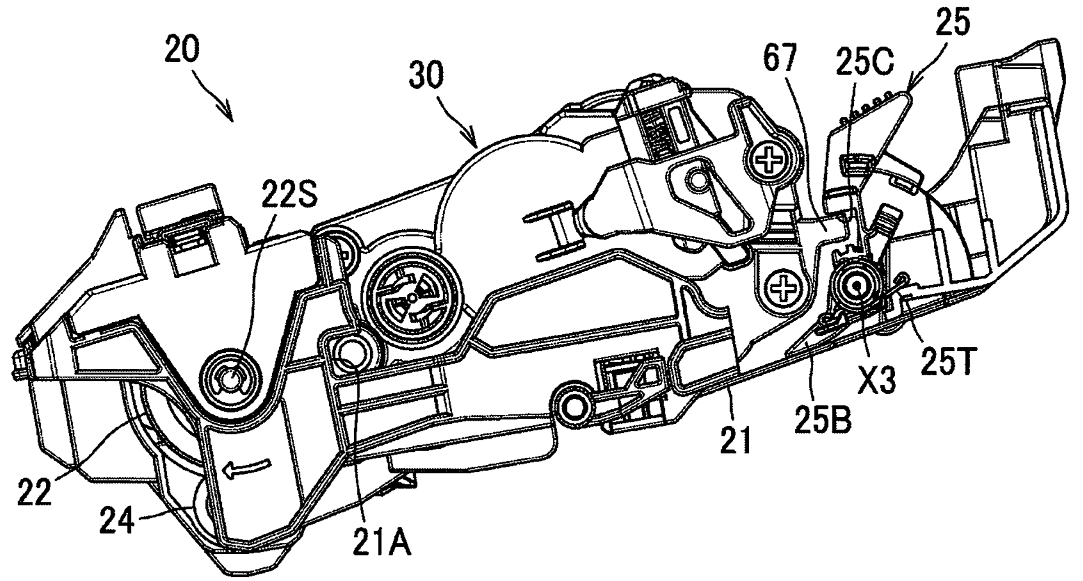
FIG. 2B is a diagram showing a state where the toner cartridge is attached to the drum cartridge.

As shown in FIG. 2A, the drum cartridge 20 is attachable to and detachable from the main housing 10. The drum cartridge 20 is attached to the main housing 10 in an attaching direction. As shown in FIG. 2B, the toner cartridge 30 is attached to the drum cartridge 20. That is, in the present embodiment, the drum cartridge 20 and the toner cartridge 30 are separable. The drum cartridge 20 is an example of a first cartridge having a photosensitive drum 22 described later. The toner cartridge 30 is an example of a second cartridge having a toner housing 31 described later. A toner memory 36 as an example of a memory described later is located at the toner cartridge 30. The drum cartridge 20 is attached to the main housing 10 in a state where the toner cartridge 30 is attached to the drum cartridge 20.

As shown in FIG. 1, the controller CU includes a CPU and so on, and executes print control. When the drum cartridge 20 is attached to the main housing 10, the controller CU communicates with the toner memory 36 described later.

The electrical contact CR is a member that contacts an electrical contact surface 36A of the toner memory 36 when the drum cartridge 20 is attached at an attached position (see FIG. 13) in the main housing 10. The electrical contact CR has a facing surface CR1 and a pin CR2 (see FIG. 7). The facing surface CR1 is a surface facing the electrical contact surface 36A. The pin CR2 is a portion that contacts the electrical contact surface 36A (see FIG. 13). The electrical contact CR contacts the electrical contact surface 36A from above in a state where the drum cartridge 20 is located at the attached position in the main housing 10. The controller CU communicates with the toner memory 36 via the electrical contact CR.

Figure 3:
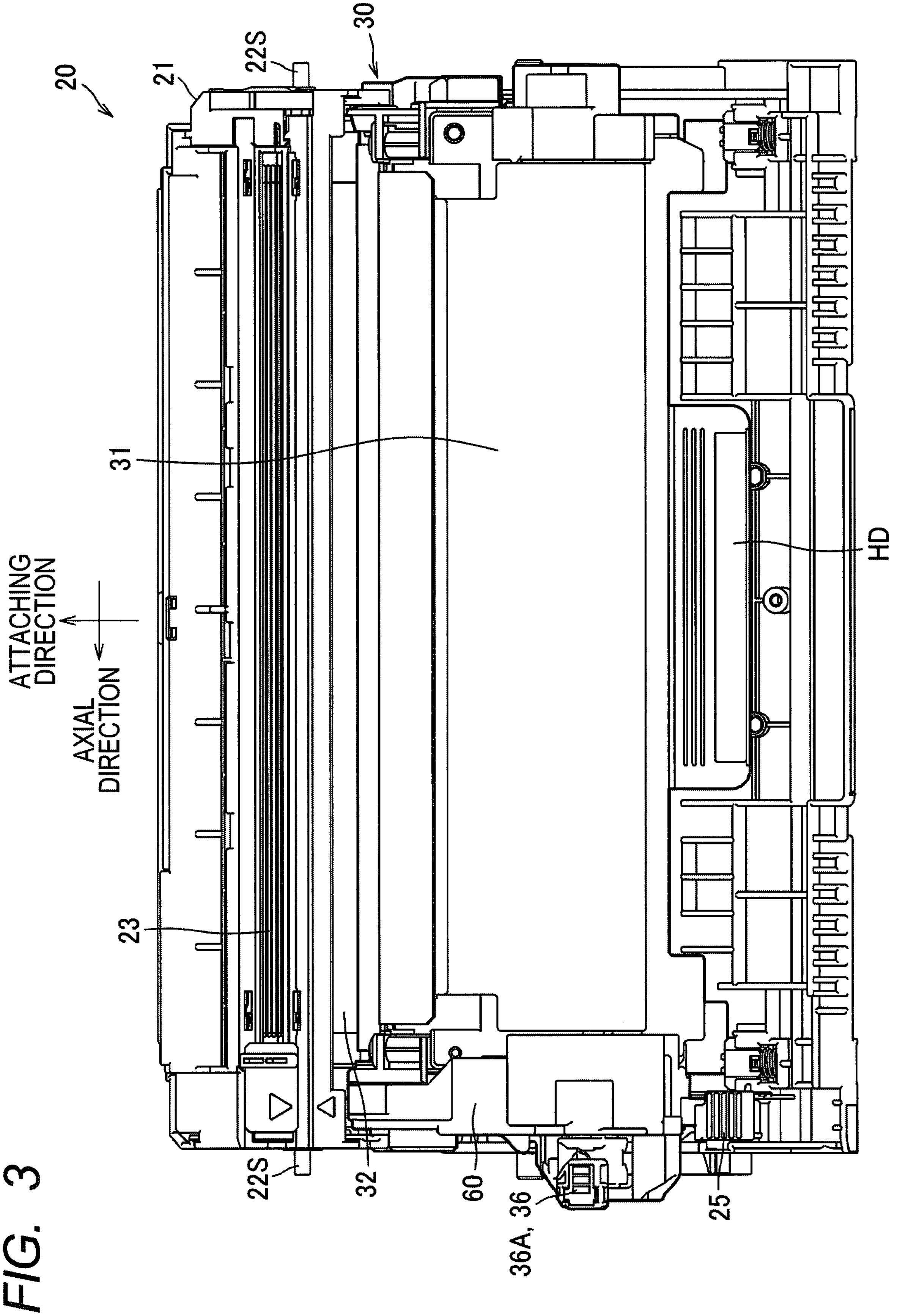
FIG. 3 is a top view of the drum cartridge.

As shown in FIGS. 1 and 3, the drum cartridge 20 has a drum frame 21, the photosensitive drum 22, a charger 23, a transfer roller 24, and a lock lever 25.

The drum frame 21 is a frame that covers an entirety of the drum cartridge 20. The drum frame 21 rotatably supports the photosensitive drum 22 and the transfer roller 24. The drum frame 21 has a guide groove 21A and a positioning boss 21B (see FIG. 8). The guide groove 21A is a groove for guiding the toner cartridge 30 when the toner cartridge 30 is attached. The positioning bosses 21B are arranged at both ends in an axial direction and located at an upstream portion of the drum frame 21 in an attaching direction. The positioning boss 21B is a boss for positioning the drum frame 21 when the drum cartridge 20 is attached to the main housing 10 (see also FIG. 14A).

The photosensitive drum 22 has a drum shaft 22S and rotates about a drum axis X1 extending in the axial direction. The drum shaft 22S protrudes outward from the drum frame 21 in the axial direction (see FIG. 3). In this specification, the axial direction is a direction in which the drum axis X1, which is the rotation axis of the photosensitive drum 22, extends. The attaching direction of the drum cartridge 20 is a direction crossing the axial direction, and in this embodiment, the attaching direction of the drum cartridge 20 is a direction perpendicular to the axial direction. In the following description, the direction perpendicular to the axial direction and the attaching direction is referred to as "perpendicular direction". In this example, as shown in FIG. 1, the "perpendicular direction" substantially extends in a vertical direction (upper-lower direction). Furthermore in this example, the angle between the perpendicular direction and the attaching direction is within the range of 70 degrees to 110 degrees, preferably within the range of 80 degrees to 100 degrees, more preferably within the range of 85 degrees to 95 degrees.

The charger 23 charges the photosensitive drum 22. The charger 23 is a scorotron charger spaced apart from the photosensitive drum 22.

The transfer roller 24 is a roller for transferring the toner on the photosensitive drum 22 onto a sheet (not shown). The transfer roller 24 is rotatable about a transfer roller axis X2 extending in the axial direction. The transfer roller 24 contacts the photosensitive drum 22.

The lock lever 25 is a member that locks the toner cartridge 30 to the drum frame 21 when the toner cartridge 30 is attached to the drum cartridge 20. The lock lever 25 is located at one end of the drum cartridge 20 in the axial direction (left side in FIG. 3).

In the following description, an arrow indicating each direction in each drawing indicates "one side" in each direction. Further, the direction opposite to "one side" in each direction is referred to as "the other side." Thus, "one side" in the attaching direction refers to the downstream side in the attaching direction, and "the other side" in the attaching direction refers to the upstream side in the attaching direction.

As shown in FIG. 2A, the lock lever 25 is rotatable about a lock lever axis X3 extending in the axial direction. The lock lever 25 is swingable between a lock position shown in FIG. 2B and a release position shown by broken lines in FIG. 2A. The lock position is a position where the lock lever 25 locks the toner cartridge 30 to the drum frame 21. The release position is a position where the locking of the toner cartridge 30 to the drum frame 21 is released.

The lock lever 25 has an operation portion 25A, a push-up portion 25B, a lock portion 25C, and a torsion spring 25T. In FIGS. 2A and 2B, a part of the drum frame 21 and a handle HD of the toner cartridge 30 are omitted for clarity.

The operation portion 25A is located at a particular distance from the lock lever axis X3. The operating portion 25A is exposed on the outer surface of the drum cartridge 20. The operation portion 25A is a part operated by a user.

The push-up portion 25B is located at the opposite side of the operation portion 25A with respect to the lock lever axis X3. The push-up portion 25B extends from the lock lever axis X3 to the side opposite to the operation portion 25A. When the user pushes the operation portion 25A, the push-up portion 25B contacts the toner cartridge 30 and pushes up the toner cartridge 30.

The lock portion 25C is located between the operation portion 25A and the push-up portion 25B. The lock portion 25C is a recess into which a part of the toner cartridge 30 is inserted when locking the toner cartridge 30. Specifically, the lock portion 25C is a recess into which a lock protrusion 67 of a gear cover 60 described later is inserted. The torsion spring 25T always urges the lock lever 25 from the release position to the lock position.

As shown in FIGS. 1 and 3, the toner cartridge 30 includes a toner housing 31, a development roller 32, a supply roller 33, a layer thickness regulating blade 34, an agitator 35, and the toner memory 36 as an example a memory, and the handle HD.

The toner housing 31 is configured to accommodate toner.

The development roller 32 is a roller that supplies toner to the photosensitive drum 22. The development roller 32 rotates about a development roller axis X4 extending in the axial direction. The development roller 32 is located at one end of the toner housing 31 in the attaching direction.

The supply roller 33 is a roller that supplies the toner in the toner housing 31 to the development roller 32. The supply roller 33 is rotatable about a supply roller axis X5 extending in the axial direction.

The layer thickness regulating blade 34 is a member for regulating the thickness of a toner layer on the development roller 32. The layer thickness regulating blade 34 contacts the development roller 32.

The agitator 35 is located inside the toner housing 31. The agitator 35 agitates toner. The agitator 35 supplies the toner in the toner housing 31 to the supply roller 33. The agitator 35 is rotatable about an agitator axis X6 extending in the axial direction.

The toner memory 36 is, for example, a medium such as an IC chip that stores information, and is not limited to an IC chip. The toner memory 36 stores information regarding the toner cartridge 30. The information regarding the toner cartridge 30 is at least identification information identifying the toner cartridge 30 or life information of the toner cartridge 30. The identification information is, for example, a serial number. The life information is, for example, at least an accumulated number of rotations of the development roller 32 or the agitator 35, a used dot count, or a remaining amount of toner.

Figure 4:
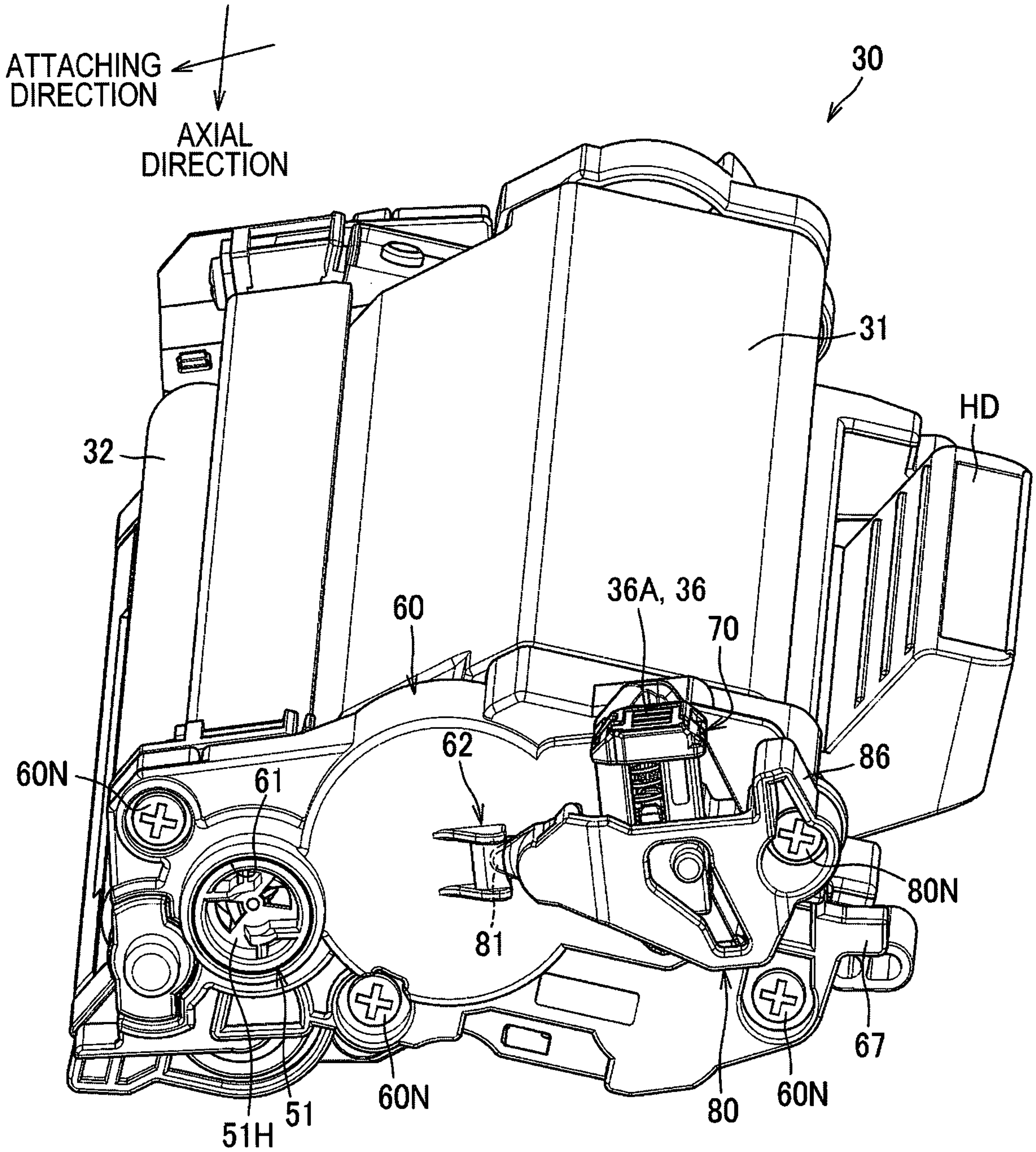
FIG. 4 is a perspective view of the toner cartridge viewed from one side in an axial direction.

The toner memory 36 has the electrical contact surface 36A (see also FIG. 4). The electrical contact surface 36A is located at a different position from the toner housing 31 in the axial direction. The electrical contact surface 36A crosses the perpendicular direction.

The handle HD is located at the end of the toner housing 31 at the other side in the attaching direction. The handle HD is a handle that a user holds when attaching or detaching the toner cartridge 30 (see also FIG. 4).

As shown in FIG. 4, the toner cartridge 30 has a coupling 51, the gear cover 60, a memory holder 70, a memory holder cover 80, and a screw 80N at one side of the toner housing 31 in the axial direction.

The coupling 51 is rotatable by receiving a driving force. The coupling 51 has a recess 51H that is recessed in the axial direction. The recess 51H engages with a drive member.

Figure 5:
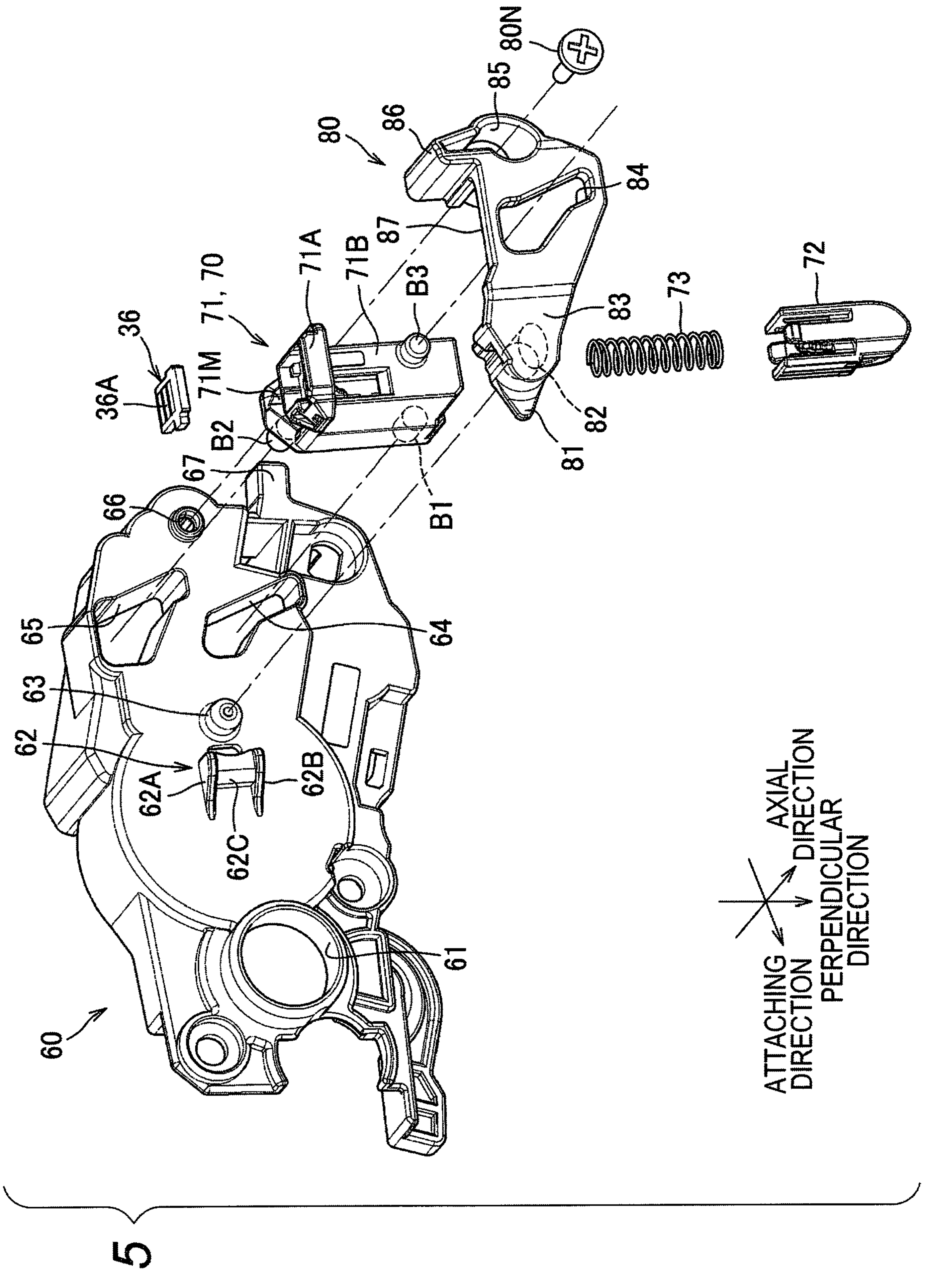
FIG. 5 is a perspective view of a gear cover, a memory holder, and a memory holder cover.

As shown in FIG. 5, the gear cover 60 is located at one side of the toner housing 31 in the axial direction. The gear cover 60 covers at least one gear located at one side of the toner housing 31. In this embodiment, the gear cover 60 covers at least part of the coupling 51. The gear cover 60 is fixed to the toner housing 31 with a plurality of screws 60N. In this embodiment, the gear cover 60 is fixed to the toner housing 31 by the screws 60N inserted from the outer surface of the gear cover 60 (see FIG. 4).

The gear cover 60 has a coupling hole 61, a hook 62, a boss 63, a first elongated hole 64, a second elongated hole 65, a screw hole 66, and the lock protrusion 67.

The coupling hole 61 is located at the end of the gear cover 60 at one side in the attaching direction. The coupling hole 61 exposes the coupling 51.

The hook 62 is located on the outer surface of the gear cover 60. The hook 62 protrudes to one side in the axial direction and opens to the other side in the attaching direction. The hook 62 is a portion for hooking (holding) a claw 81 described later of the memory holder cover 80 so that the memory holder cover 80 does not separate to one side in the axial direction in a state where the claw 81 enters from the other side in the attaching direction. The hook 62 has a first rib 62A, a second rib 62B, and a connecting portion 62C.

The first rib 62A protrudes to one side in the axial direction. The first rib 62A extends in the attaching direction. The first rib 62A is inclined so as to be located from the other side to one side in the axial direction as it progresses from one side to the other side in the attaching direction.

The second rib 62B protrudes to one side in the axial direction. The second rib 62B extends in the attaching direction. The second rib 62B is inclined so as to be located from the other side to the one side in the axial direction as it progresses from one side to the other side in the attaching direction. The second rib 62B is spaced from the first rib 62A in the perpendicular direction.

The connecting portion 62C connects the first rib 62A and the second rib 62B. The connecting portion 62C extends in the perpendicular direction.

The boss 63 is located on the outer surface of the gear cover 60. The boss 63 protrudes to one side in the axial direction. The boss 63 is located between the hook 62 and the screw hole 66.

The first elongated hole 64 and the second elongated hole 65 are elongated holes extending in the perpendicular direction. Each of the first elongated hole 64 and the second elongated hole 65 has a smaller width in the attaching direction toward one side in the perpendicular direction, and has a larger width in the attaching direction toward the other side in the perpendicular direction. The first elongated hole 64 is located at one side of the second elongated hole 65 in the perpendicular direction.

The screw hole 66 is located at an end portion at the other side in the attaching direction. The screw hole 66 is a hole into which the screw 80N for fixing the memory holder cover 80 to the gear cover 60 is inserted.

The lock protrusion 67 is located at the end on the other side in the attaching direction and protrudes to the other side in the attaching direction.

The memory holder 70 is a member that holds the toner memory 36. The memory holder 70 holds the toner memory 36 such that the electrical contact surface 36A of the toner memory 36 is movable relative to the toner housing 31. The memory holder 70 has a first holder 71, a second holder 72, and a first spring 73.

The first holder 71 has a pedestal 71A, a tubular portion 71B, a first boss B1, a second boss B2, a third boss B3, and a holder groove 71M. The pedestal 71A is a portion that holds the toner memory 36. The pedestal 71A protrudes from the tubular portion 71B toward one side in the axial direction.

The tubular portion 71B has a rectangular tubular shape. The tubular portion 71B extends from the pedestal 71A toward the opposite side of the toner memory 36. The first boss B1 and the second boss B2 protrude from the tubular portion 71B toward the gear cover 60, that is, to the other side in the axial direction. The first boss B1 fits in the first elongated hole 64. The second boss B2 is located a particular distance away from the first boss B1 at the other side in the perpendicular direction. The second boss B2 fits in the second elongated hole 65. The third boss B3 protrudes from the tubular portion 70B toward one side in the axial direction. The third boss B3 fits in a third elongated hole 84 described later. The holder groove 71M extends in the attaching direction. When the drum cartridge 20 is attached to the main housing 10, a rib RI described later fits into the holder groove 71M.

Figures 6A, 6B:
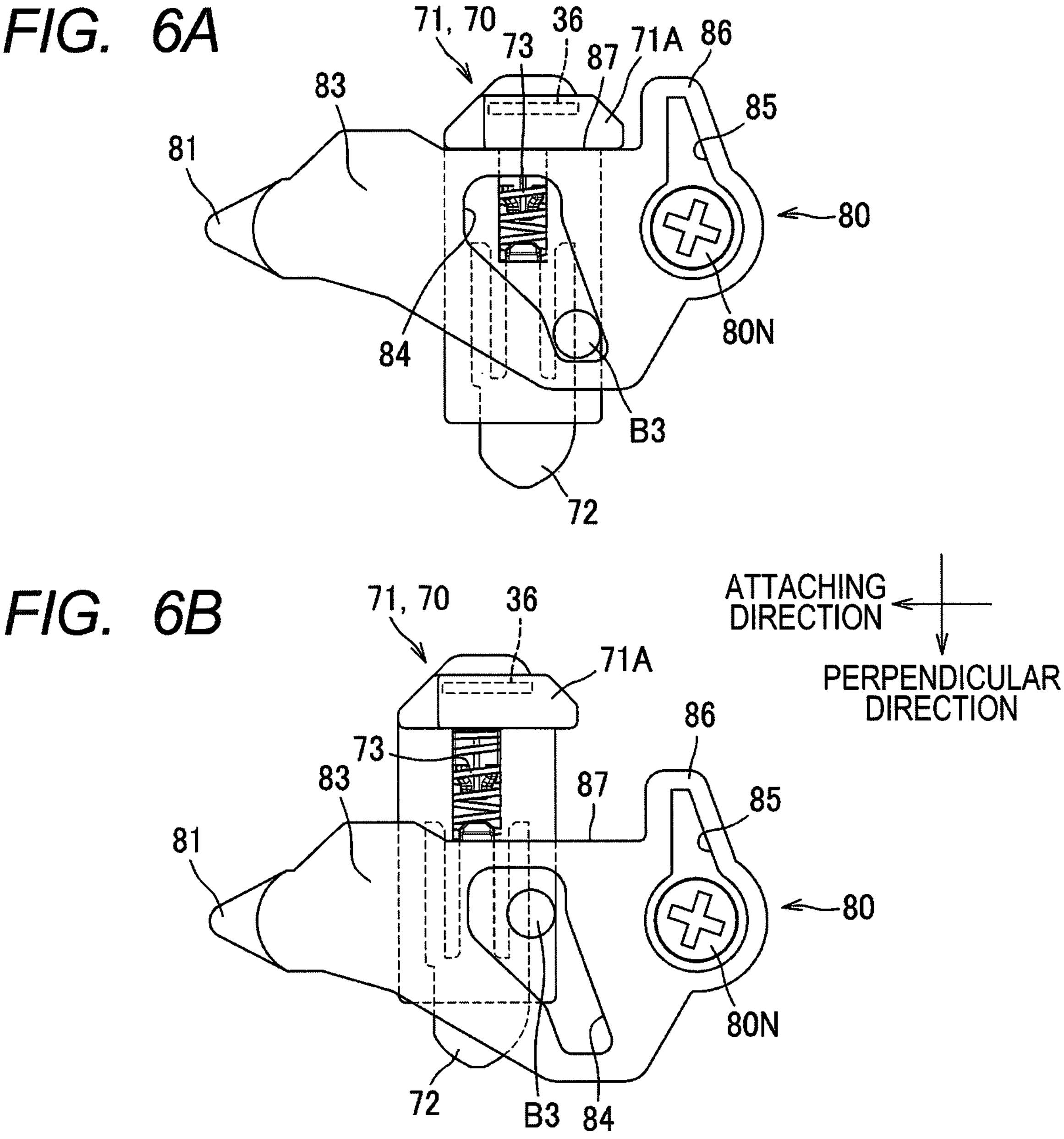
FIG. 6A is a diagram illustrating movement of the memory holder held by the memory holder cover, in which the memory holder is located at a first position.
FIG. 6B is a diagram illustrating movement of the memory holder held by the memory holder cover, in which the memory holder is located at a second position.

As shown in FIG. 6A, the second holder 72 is located inside the tubular portion 71B. The second holder 72 is slidably held inside the first holder 71 and is slidable relative to the first holder 71 in the perpendicular direction. The first spring 73 is located between the first holder 71 and the second holder 72. The first spring 73 extends in the perpendicular direction. The first spring 73 is a coil spring. The first spring 73 urges the first holder 71 and the second holder 72 so as to be away from each other.

As shown in FIG. 5, the memory holder cover 80 is a member that holds the memory holder 70 so as to be movable with respect to the memory holder cover 80 in the perpendicular direction perpendicular to the axial direction and the attaching direction. As shown in FIG. 3, at least part of the memory holder cover 80 is farther away from the outer surface of the toner housing 31 in the axial direction than the lock lever 25 is. That is, the memory holder cover 80 protrudes farther toward one side in the axial direction than the lock lever 25 is.

As shown in FIG. 5, the memory holder cover 80 is fixed to the gear cover 60 with the screw 80N in a state where the claw 81 is inserted into the hook 62 of the gear cover 60. The memory holder cover 80 has the claw 81, a boss hole 82, an inclined surface 83, the third elongated hole 84, a screw hole 85, a protrusion 86, and a holding surface 87.

The claw 81 is located at the end of the memory holder cover 80 at one side in the attaching direction. The claw 81 has a triangular shape with a rounded tip. The size of the claw 81 in the perpendicular direction decreases toward one side in the attaching direction. When the memory holder cover 80 is fixed to the gear cover 60, the claw 81 fits into the hook 62 and the claw 81 contacts the connecting portion 62C of the hook 62.

The boss hole 82 is a hole into which the boss 63 of the gear cover 60 is inserted.

The inclined surface 83 is located at the end of the memory holder cover 80 at one side in the attaching direction. The inclined surface 83 is located between the claw 81 and the third elongated hole 84 in the attaching direction. The inclined surface 83 is a surface that is inclined toward one side in the axial direction as the distance from the development roller 32 increases.

The third elongated hole 84 is an example of an elongated hole elongated in the perpendicular direction which is perpendicular to the axial direction and the attaching direction. The width of the third elongated hole 84 in the attaching direction decreases toward one side in the perpendicular direction and increases toward the other side in the perpendicular direction. The third elongated hole 84 receives the third boss B3.

The screw hole 85 is a hole into which the screw 80N is inserted. The screw 80N is inserted from one side of the gear cover 60 in the axial direction, that is, from the outer surface. In a state where the screw 80N is inserted into the screw hole 85, the claw 81, the screw 80N and the boss hole 82 are aligned in a line.

The protrusion 86 is located at the end at the other side in the attaching direction. The protrusion 86 is farther from the development roller 32 in the attaching direction than the claw 81 is. The protrusion 86 protrudes toward the other side in the perpendicular direction.

The holding surface 87 is a surface perpendicular to the perpendicular direction, and is located at the end at the other end side in the perpendicular direction. The holding surface 87 holds the pedestal 71A of the memory holder 70.

Due to the above-described configuration of the memory holder 70, as shown in FIGS. 6A and 6B, the memory holder 70 is movable relative to the toner housing 31 in the attaching direction and the perpendicular direction. Specifically, the memory holder 70 is movable between a first position shown in FIG. 6A and a second position shown in FIG. 6B.

As shown in FIG. 6A, the first position is a position where the memory holder 70 is located when the toner cartridge 30 is not attached to the main housing 10 of the image forming apparatus 1. Specifically, in a state where the memory holder 70 is located at the first position, the pedestal 71A of the memory holder 70 contacts the holding surface 87 of the memory holder cover 80.

As shown in FIG. 6B, the second position is a position where the memory holder 70 is located when the toner cartridge 30 is attached to the main housing 10 of the image forming apparatus 1 in a state where the toner cartridge 30 is attached to the drum cartridge 20. When the toner cartridge 30 is attached to the drum cartridge 20, the second holder 72 is pressed toward the other side in the perpendicular direction by a lower guide surface 200 (see FIG. 7) described later. Thus, when the memory holder 70 is located at the second position, the electrical contact surface 36A of the toner memory 36 is located farther toward the other side in the perpendicular direction than the electrical contact surface 36A of the memory holder 70 located at the first position is. Further, when the memory holder 70 is located at the second position, the electrical contact surface 36A of the toner memory 36 is located farther toward one side in the attaching direction than the electrical contact surface 36A of the memory holder 70 located at the first position is. When the memory holder 70 is located at the second position, the toner memory 36 is urged against the electrical contact CR by the urging force of the first spring 73, and the electrical contact surface 36A contacts the electrical contact CR (see FIG. 1).

Figure 7:
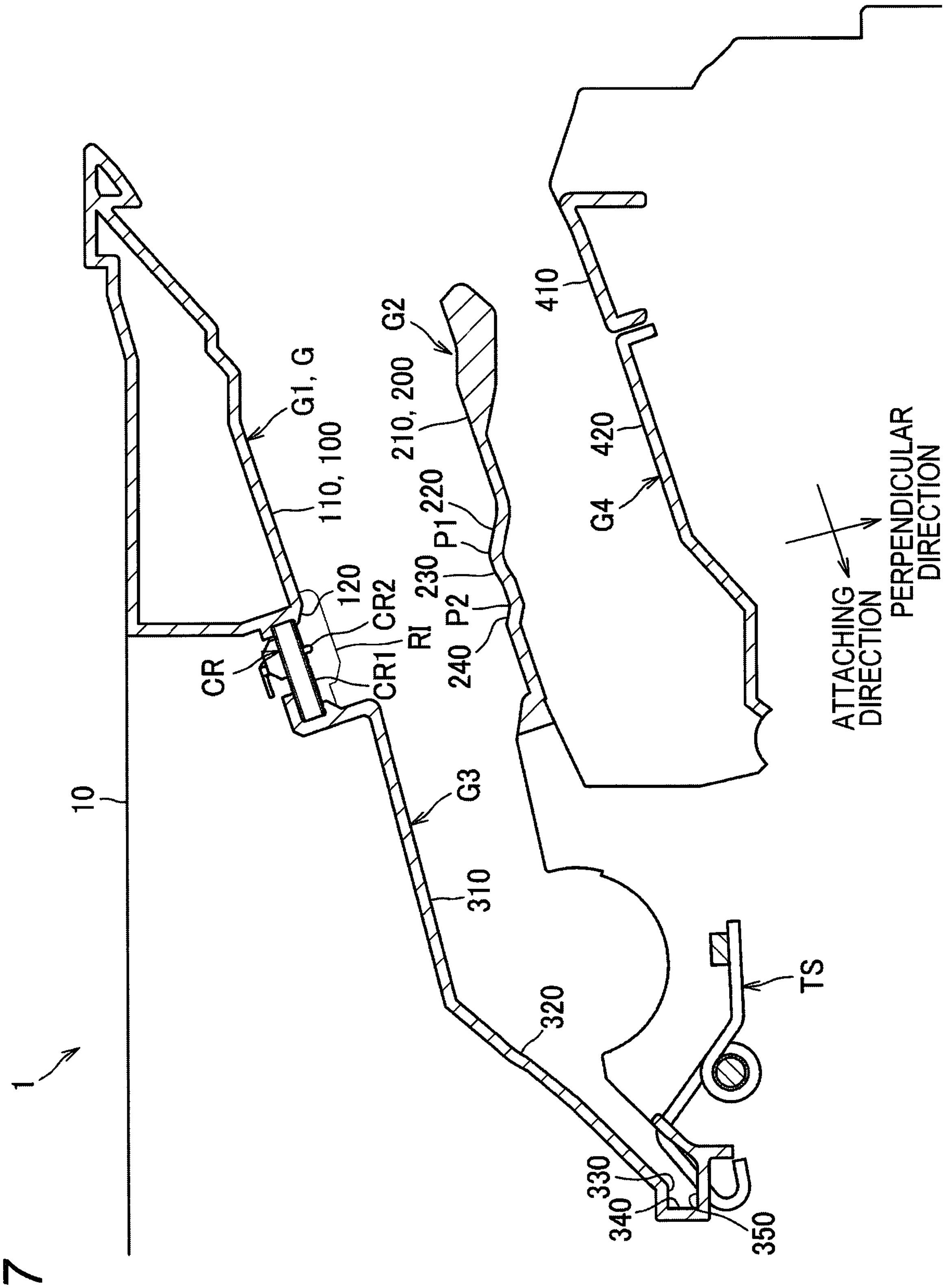
FIG. 7 is a diagram showing a configuration of a guide groove that guides the drum cartridge.

As shown in FIG. 7, the main housing has a guide groove G for guiding attachment and detachment of the drum cartridge 20 and the toner cartridge 30, and a second spring TS for positioning the photosensitive drum 22.

The guide groove G has a first guide G1 as an example of an upper guide, a second guide G2 as an example of a lower guide, a third guide G3, and a fourth guide G4. In a state where the drum cartridge 20 is located at the attached position, the electrical contact surface 36A extends parallel to at least part of the first guide G1 or at least part of the second guide G2 (see FIG. 13). Here, the "extends parallel" in this application not only includes that the electrical contact surface 36A extends completely parallel to at least part of the first guide G1 or at least part of the second guide G2, but also includes that the electrical contact surface 36A extends substantially parallel to at least part of the first guide G1 or at least part of the second guide G2. For example, an angle formed by the electrical contact surface 36A and at least part of the first guide G1 may be 0 to approximately 10 degrees, or an angle formed by the electrical contact surface 36A and at least part of the second guide G2 may be 0 to approximately 10 degrees.

The first guide G1 and the second guide G2 are located on a side wall of the main housing 10 at one side in the axial direction. The first guide G1 and the second guide G2 guide the memory holder 70 when the drum cartridge 20 is attached or detached.

The third guides G3 are located on both side walls of the main housing 10 in the axial direction. The third guides G3 guide the drum shaft 22S when the drum cartridge 20 is attached or detached.

The fourth guides G4 are located on both side walls of the main housing 10 in the axial direction. The fourth guides G4 guide the positioning boss 21B when the drum cartridge 20 is attached or detached.

The first guide G1 has a rib RI and an upper guide surface 100 facing downward. The upper guide surface 100 is a surface that guides movement of the memory holder 70 from above when the drum cartridge 20 is attached or detached. The upper guide surface 100 has a first upper surface 110, a second upper surface 120, and an inclined surface 100K (see FIG. 14A).

The rib RI is aligned with the electrical contact CR in the axial direction and protrudes downward. The rib RI enters the holder groove 71M of the memory holder 70 when the drum cartridge 20 is attached to the main housing 10. In a state where the rib RI is fitted in the holder groove 71M, the memory holder 70 is positioned with respect to the axial direction.

The first upper surface 110 is a flat surface and extends obliquely so as to be located downward toward the downstream side in the attaching direction. The first upper surface 110 extends parallel to the facing surface CR1. In this embodiment, the attaching direction is the direction in which the upper guide surface 100 of the first guide G1 extends.

The second upper surface 120 extends to connect the electrical contact CR and the first upper surface 110. The second upper surface 120 is inclined relative to the first upper surface 110 so as to approach the electrical contact CR from the first upper surface 110. In this embodiment, the second upper surface 120 is a flat surface and extends upward from the first upper surface 110.

Figure 14A:
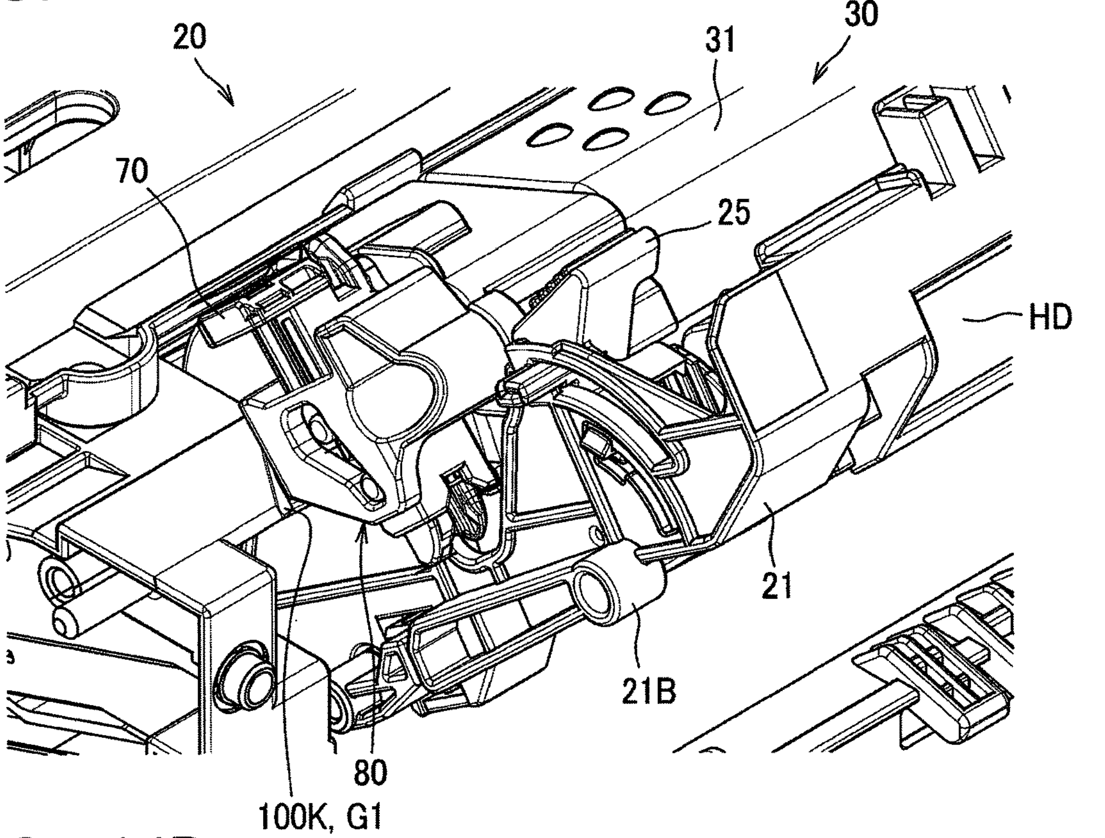
FIG. 14A is a diagram for explaining an inclined surface provided at an entrance of the upper guide.

As shown in FIG. 14A, the inclined surface 100K is located at the entrance of the first guide G1. The inclined surface 100K is a surface that is inclined to be located toward one side in the axial direction toward a direction in which the drum cartridge 20 is detached.

Returning to FIG. 7, the second guide G2 has a lower guide surface 200 facing upward. The lower guide surface 200 is a surface that guides the movement of the memory holder 70 from below when the drum cartridge 20 is attached or detached. The lower guide surface 200 has a first lower surface 210, a second lower surface 220, a third lower surface 230, and a fourth lower surface 240.

The first lower surface 210 is a flat surface and extends parallel to the facing surface CR1. That is, the first lower surface 210 extends parallel to the first upper surface 110.

The second lower surface 220 is a surface that is inclined relative to the first lower surface 210 so as to approach the electrical contact CR toward the downstream side in the attaching direction from the first lower surface 210. That is, the second lower surface 220 extends obliquely relative to the first lower surface 210 so as to be located higher toward the downstream side in the attaching direction.

The third lower surface 230 is a surface that is inclined relative to the second lower surface 220 so as to be away from the electrical contact CR toward the downstream side in the attaching direction from the second lower surface 220. That is, the third lower surface 230 extends obliquely relative to the first lower surface 210 so as to be located downward toward the downstream side in the attaching direction. The third lower surface 230, together with the second lower surface 220, constitutes a concave portion that protrudes toward the upper guide surface 100. In FIG. 7, an apex of the convex portion is indicated by P1.

The fourth lower surface 240 is a surface inclined relative to the third lower surface 230 so as to approach the electrical contact CR toward the downstream side in the attaching direction from the third lower surface 230. That is, the fourth lower surface 240 extends obliquely relative to the first lower surface 210 so as to be located higher toward the downstream side in the attaching direction. The fourth lower surface 240, together with the third lower surface 230, forms a concave portion facing the upper guide surface 100. In FIG. 7, a bottom of the concave portion is indicated by P2.

The third guide G3 has a first guide surface 310, a second guide surface 320, a third guide surface 330, a fourth guide surface 340, and a fifth guide surface 350.

Figure 13:
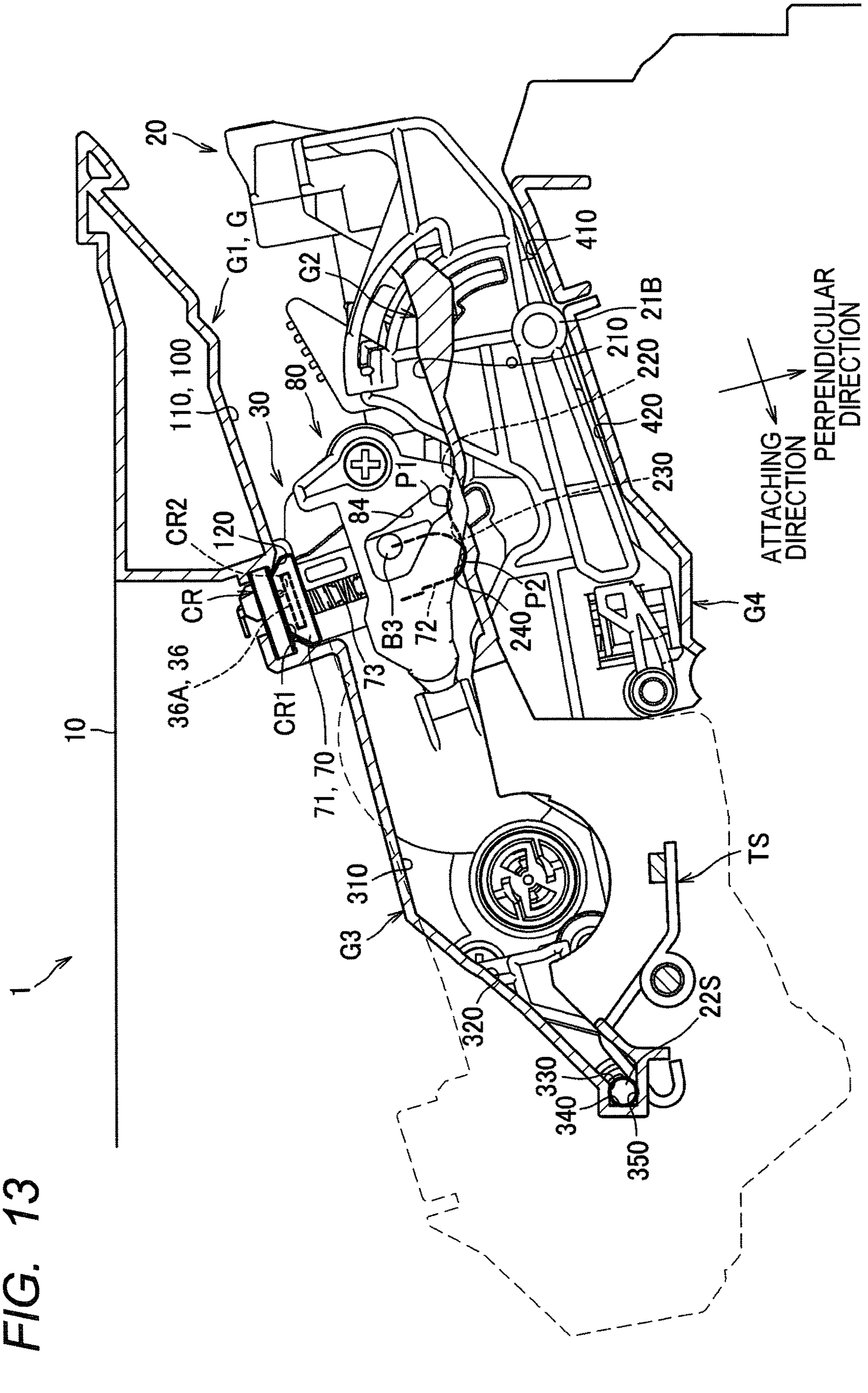
FIG. 13 is a diagram for explaining the process of attaching the drum cartridge to the main housing, showing a state where the shaft of the photosensitive drum is located at the correct position.

The three surfaces of the third guide surface 330, the fourth guide surface 340, and the fifth guide surface 350 form a U-shape. As shown in FIG. 13, the U-shaped portion formed by the third guide surface 330, the fourth guide surface 340, and the fifth guide surface 350 receives the drum shaft 22S when the drum cartridge 20 is located at the attached position.

The first guide surface 310 and the second guide surface 320 are surfaces that guide the drum shaft 22S from the vicinity of the electrical contact CR to the attached position. Specifically, the first guide surface 310 extends substantially parallel to the first upper surface 110 from the vicinity of the electrical contact CR. The second guide surface 320 connects the first guide surface 310 and the third guide surface 330, and is inclined downward toward the downstream side in the attaching direction.

The third guide surface 330 and the fifth guide surface 350 extend substantially horizontally. The fifth guide surface 350 is separated from the third guide surface 330 by the diameter of the drum shaft 22S. The fifth guide surface 350 is longer than the third guide surface 330 in a horizontal direction. The fourth guide surface 340 connects the third guide surface 330 and the fifth guide surface 350 and extends vertically.

The fourth guide G4 is a guide that guides the positioning boss 21B located on a lower side of the drum frame 21 from below. The fourth guide G4 has a sixth guide surface 410 and a seventh guide surface 420.

The sixth guide surface 410 and the seventh guide surface 420 extend parallel to the first upper surface 110. The seventh guide surface 420 contacts the positioning boss 21B when the drum cartridge 20 is located at the attached position. When the drum cartridge 20 is located at the attached position, the seventh guide surface 420 contacts the positioning boss 21B whereby the drum cartridge 20 is positioned so as not to swing clockwise in FIG. 13 around the drum shaft 22S. The sixth guide surface 410 guides the positioning boss 21B to the seventh guide surface 420.

The second spring TS is a spring for positioning the drum shaft 22S at a correct position. The second spring TS is a torsion spring. In a state where the drum cartridge 20 is at the attached position, the second spring TS urges the drum shaft 22S, which is the shaft of the photosensitive drum 22, to push the drum shaft 22S against the third guide surface 330 and the fourth guide surface 340, thereby positioning the drum shaft 22S.

Next, referring to FIGS. 8 to 13, a process of attaching the drum cartridge 20 to the main housing 10 will be described.

Figure 8:
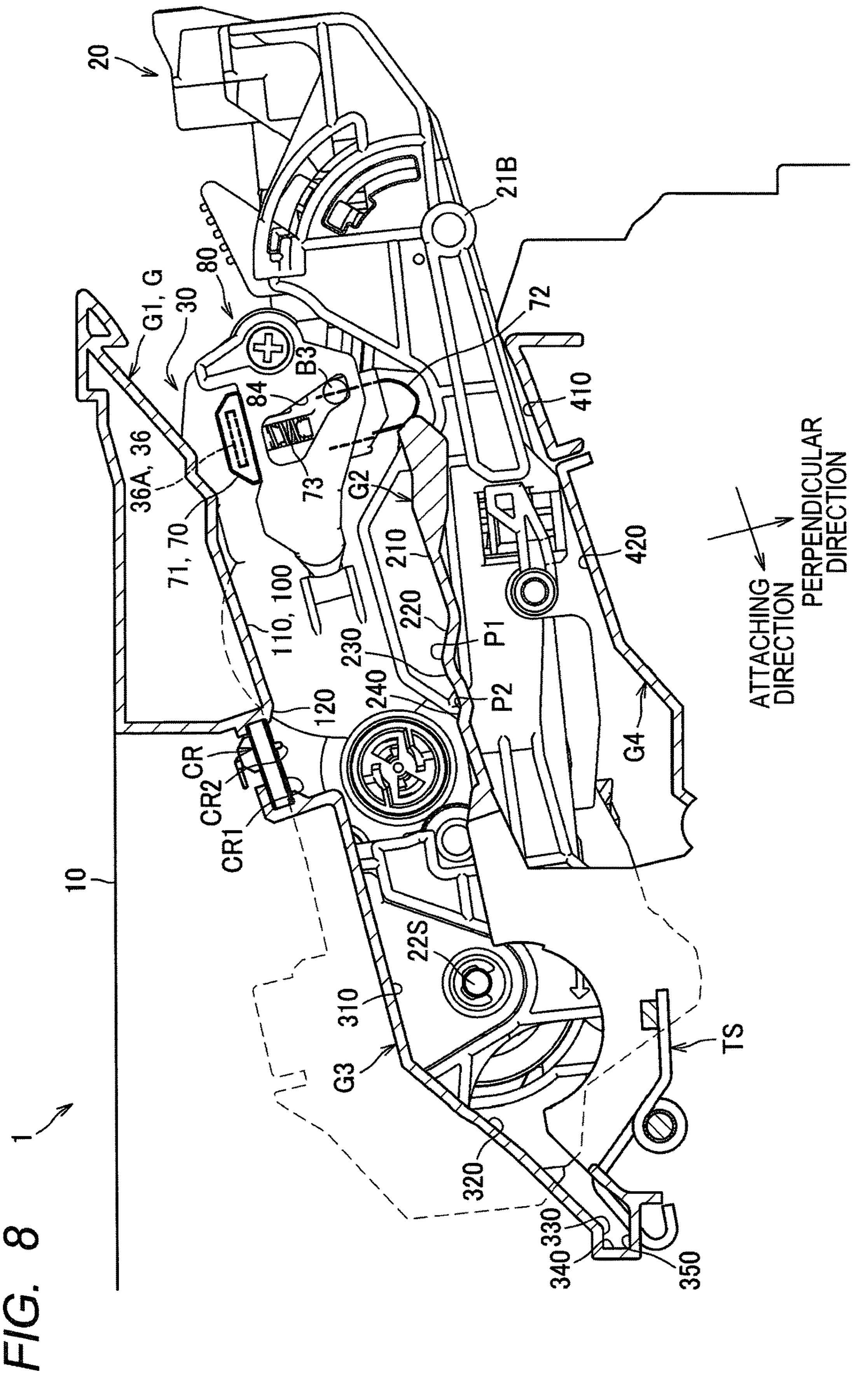
FIG. 8 is a diagram for explaining a process of attaching the drum cartridge to a main housing, showing a state before the memory holder enters a lower guide.

As shown in FIG. 8, when attaching the drum cartridge 20 to the main housing 10, the drum cartridge 20 is inserted into the main housing 10 in a state where the drum shaft 22S is at the downstream side. FIG. 8 shows a state before the second holder 72 of the memory holder 70 enters the second guide G2.

When the drum cartridge 20 is inserted into the main housing 10 from the state shown in FIG. 8, the third boss B3 is pushed by the edge of the third elongated hole 84, whereby the memory holder 70 moves together with the memory holder cover 80. Then, the first holder 71 of the memory holder 70 contacts the first upper surface 110 and the second holder 72 contacts the first lower surface 210. Thereby, the first upper surface 110 presses the first holder 71 and the first lower surface 210 presses the second holder 72. This causes the first holder 71 and the second holder 72 to move closer to each other, and the first spring 73 becomes a compressed state.

After that, when the drum cartridge 20 is further inserted into the main housing 10, the second holder 72 contacts the second lower surface 220 and is pressed by the second lower surface 220, and the first spring 73 is further compressed.

Figure 9:
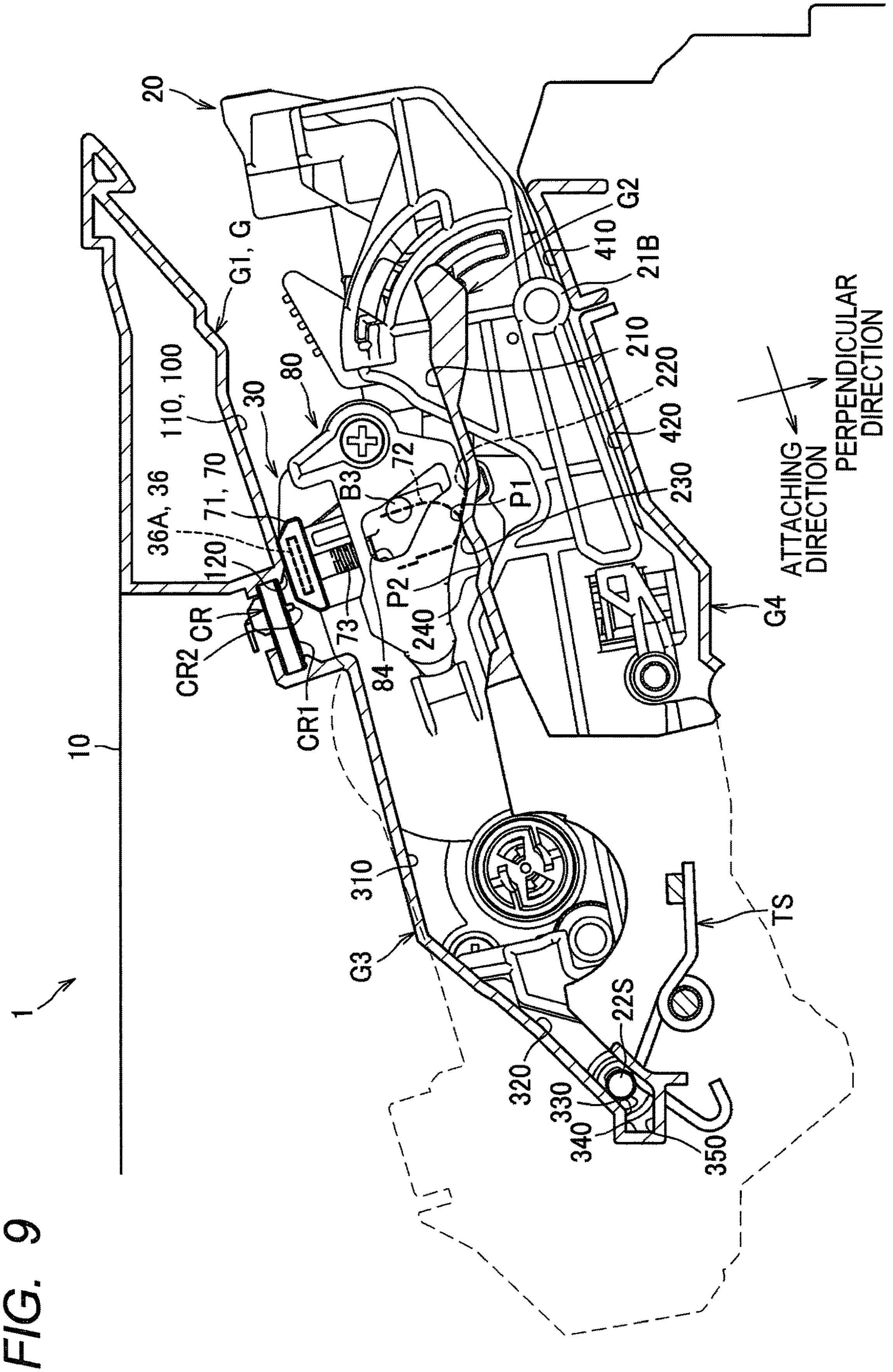
FIG. 9 is a diagram for explaining the process of attaching the drum cartridge to the main housing, showing a state where the memory holder is in contact with an upper guide and the lower guide.

Then, as shown in FIG. 9, when the second holder 72 reaches the apex P1 of the convex portion, the memory holder 70 is sandwiched between the first upper surface 110 and the apex P1 of the convex portion, causing the first spring 73 to be in the most compressed state.

After that, the first holder 71 of the memory holder 70 contacts the second upper surface 120, and the second holder 72 contacts the third lower surface 230. Then, the urging force of the first spring 73 in a compressed state causes the memory holder 70 to slide relative to the second upper surface 120 and the third lower surface 230 and move in the attaching direction. That is, due to the urging force of the first spring 73, the first holder 71 presses the second upper surface 120 and the second holder 72 presses the third lower surface 230, thereby moving the entire memory holder 70 toward the attached position (see FIG. 10).

Until the first holder 71 contacts the second upper surface 120 and the second holder 72 contacts the third lower surface 230, the third boss B3 is pushed by the third elongated hole 84 and thereby the memory holder 70 moves together with the memory holder cover 80. However, after the first holder 71 contacts the second upper surface 120 and the second holder 72 contacts the third lower surface 230, the memory holder 70 moves autonomously due to the urging force of the first spring 73.

Figure 11:
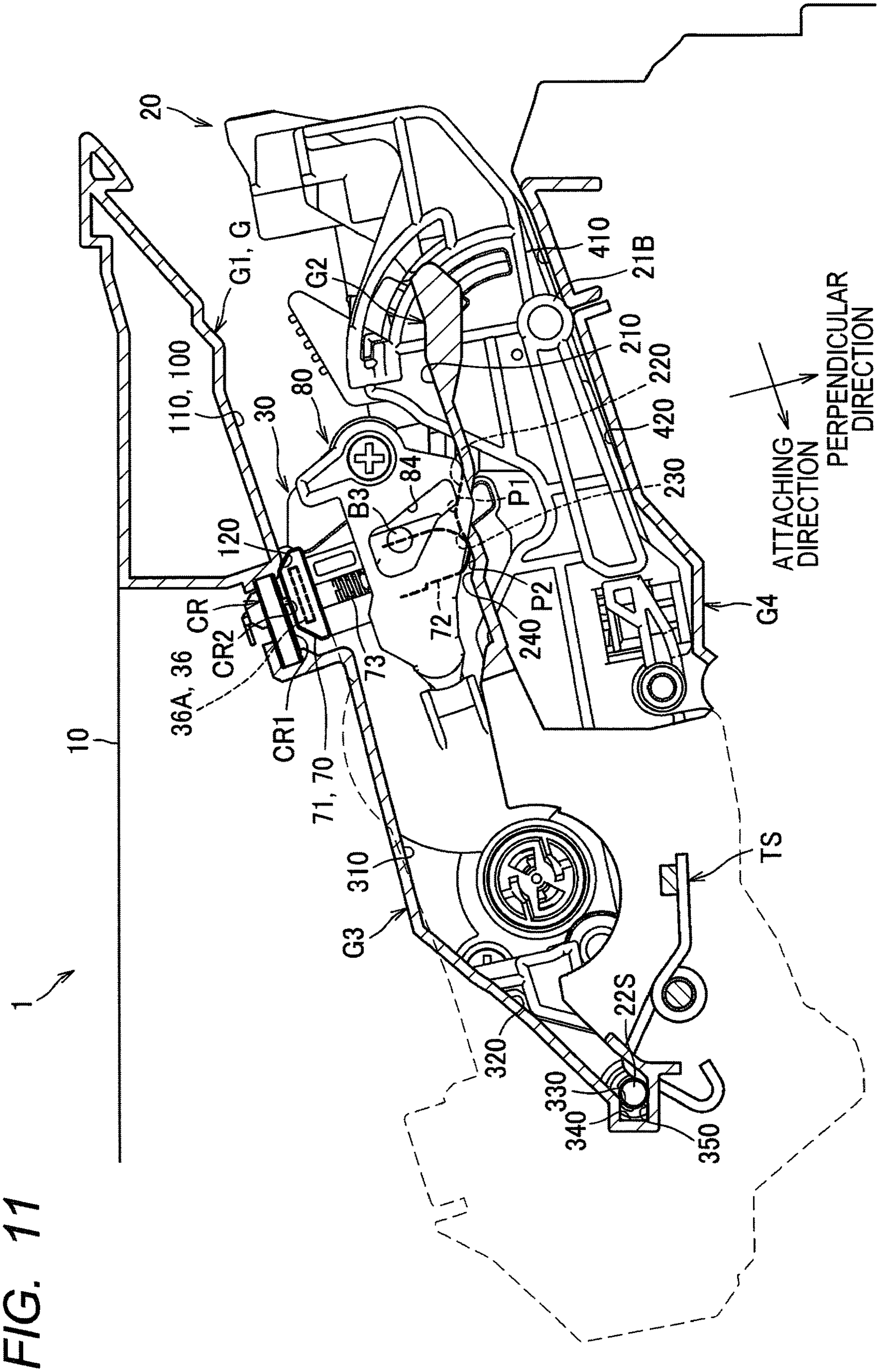
FIG. 11 is a diagram for explaining the process of attaching the drum cartridge to the main housing, showing a state where the memory holder is in contact with the second upper surface and a third lower surface.
Figure 12:
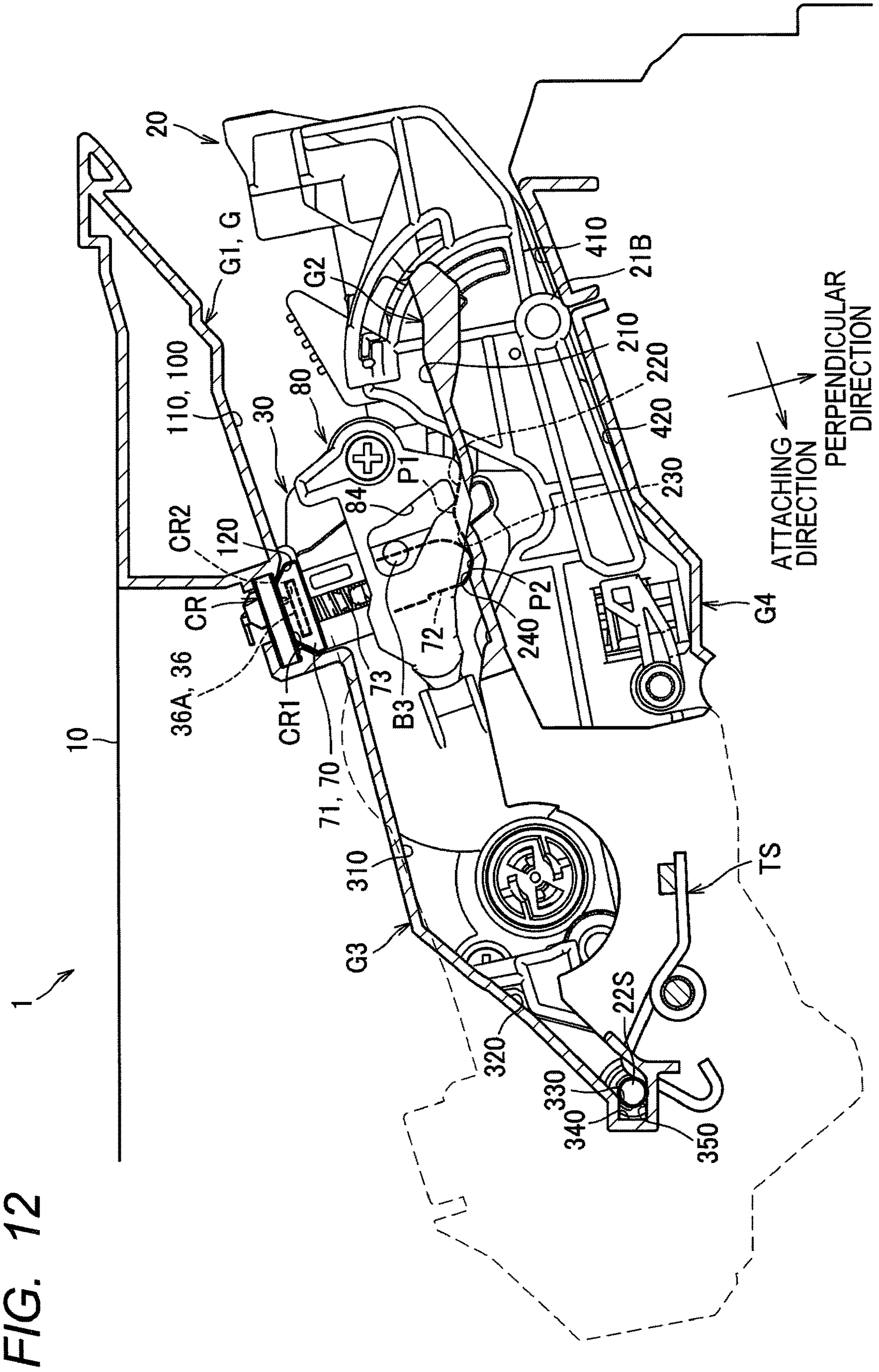
FIG. 12 is a diagram for explaining the process of attaching the drum cartridge to the main housing, showing a state where the memory holder is located at such a position that an electrical contact surface contacts a contact member and before a shaft of a photosensitive drum is located at a correct position.

After that, as shown in FIG. 11, the second holder 72 slides downward relative to the third lower surface 230, and the first holder 71 slides upward relative to the second upper surface 120, whereby the memory holder 70 reaches a contact position shown in FIG. 12 where the memory holder 70 contacts the electrical contact CR.

In the state shown in FIG. 12, the memory holder 70 has reached the contact position, but the drum shaft 22S, which is the shaft of the photosensitive drum 22, has not reached the final position, that is, the correct position. Specifically, in the state shown in FIG. 12, the drum shaft 22S is in contact with the third guide surface 330 and the fifth guide surface 350 of the third guide G3, but is not in contact with the fourth guide surface 340. Thus, the drum shaft 22S is not located at the correct position.

After that, as shown in FIG. 13, the drum shaft 22S is pressed by the second spring TS and pulled into the correct position. That is, the drum shaft 22S is pressed by the second spring TS and contacts the fourth guide surface 340.

In this way, in the process of attaching the drum cartridge 20 to the main housing 10, the first spring 73 starts moving the memory holder 70 to the contact position before the second spring TS moves the drum shaft 22S and the drum shaft 22S is located at the correct position.

In a state where the drum cartridge 20 and the toner cartridge 30 are in the attached position, the electrical contact surface 36A is parallel to the first upper surface 110, the first lower surface 210, the sixth guide surface 410, and the seventh guide surface 420. Further, in a state where the drum cartridge 20 and the toner cartridge 30 are in the attached position, the facing surface CR1 is parallel to the electrical contact surface 36A, the first upper surface 110, the first lower surface 210, the sixth guide surface 410, and the seventh guide surface 420.

According to the above, the following effects are obtained in this embodiment.

In a state where the drum cartridge 20 is in the attached position where the drum cartridge 20 is attached to the main housing 10, the electrical contact surface 36A of the toner memory 36 is parallel to at least part of the upper guide surface 100 or at least part of the lower guide surface 200 (see FIG. 13). Thus, compared with a case where the electrical contact surface 36A is not parallel to above-mentioned surfaces, in the process of attaching and detaching the drum cartridge 20, the length of compressing the first spring 73 of the memory holder 70 does not become unnecessarily large, which reduces attachment and detachment resistance.

Figure 10:
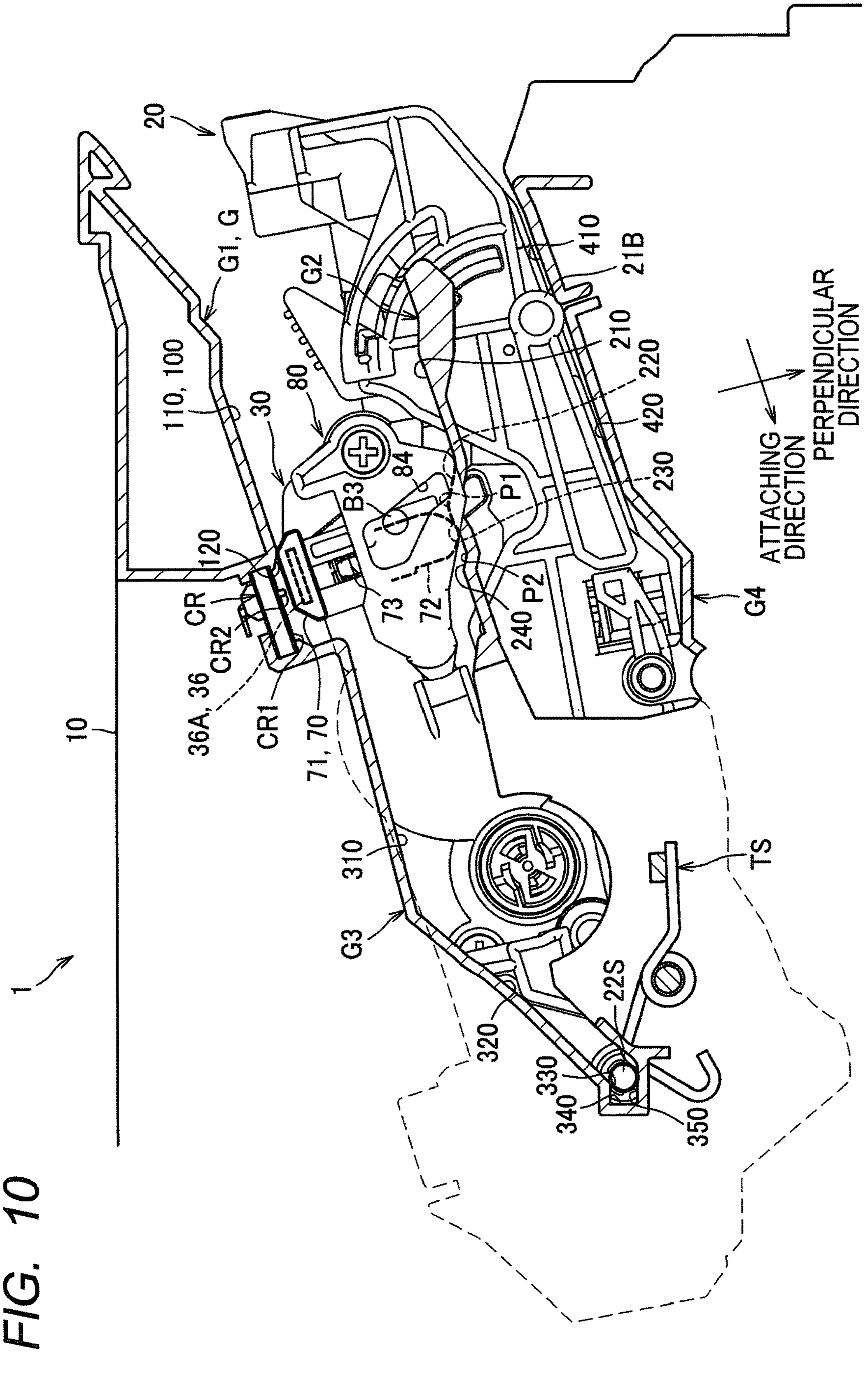
FIG. 10 is a diagram for explaining the process of attaching the drum cartridge to the main housing, showing a state where the memory holder begins to contact a second upper surface.

In the process of attaching the drum cartridge 20 to the main housing 10, when the first holder 71 of the memory holder 70 contacts the second upper surface 120 and the second holder 72 contacts the third lower surface 230, the urging force of the first spring 73 moves the memory holder 70 in the attaching direction (see FIG. 10). Thus, in the process of attaching the drum cartridge 20 to the main housing 10, the memory holder 70 autonomously moves in the attaching direction due to the urging force of the first spring 73.

Figure 15A:
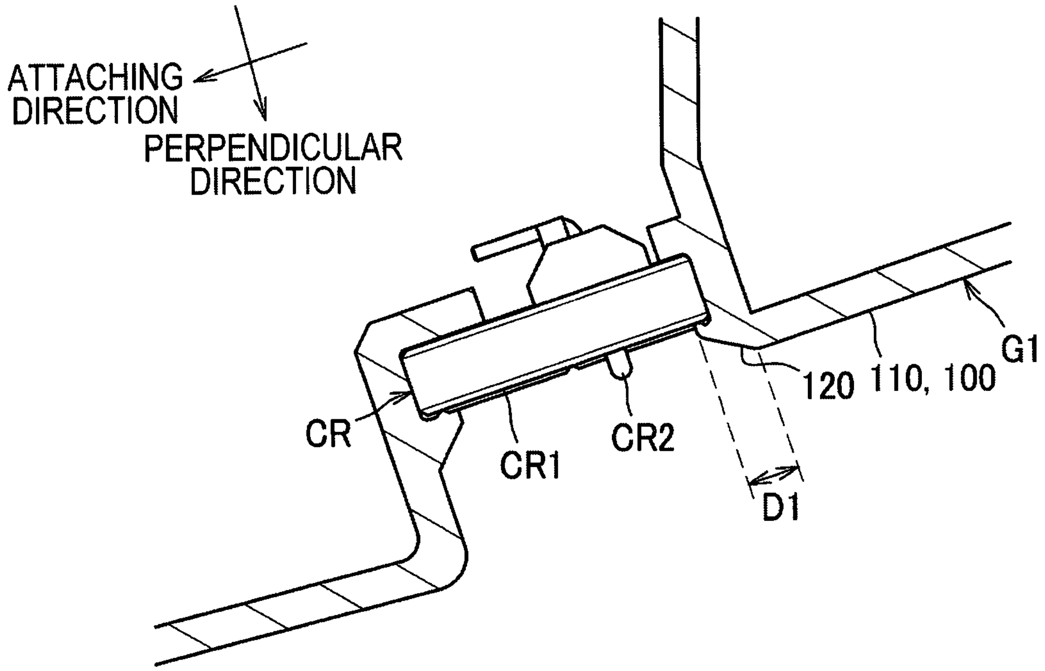
FIG. 15A is an enlarged view of an electrical contact and an upper guide surface.
Figure 15B:
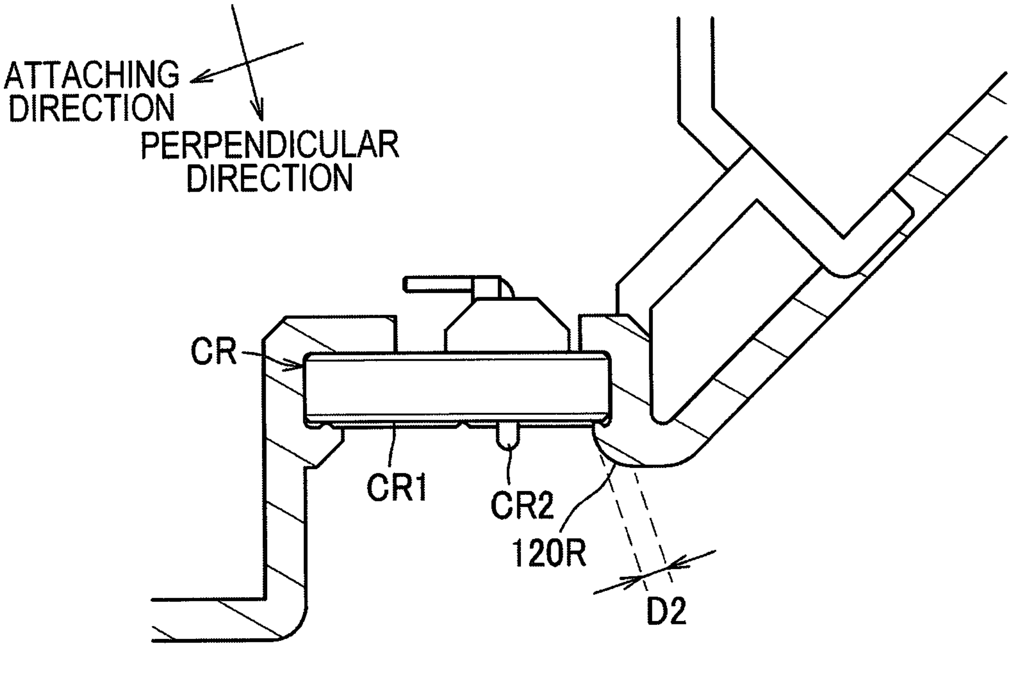
FIG. 15B is a diagram showing a comparative example in which a second upper surface is not provided.

In a comparative example shown in FIG. 15B, for example, a curved surface 120R is provided on the guide surface adjacent to the electrical contact CR. In this embodiment, as shown in FIG. 15A, the guide surface adjacent to the electrical contact CR is the second upper surface 120 which is a flat surface. Since the second upper surface 120 is a flat surface, a distance D1 in the attaching direction where the first holder 71 and the second upper surface 120 contact each other is longer than a distance D2 in the attaching direction where the first holder 71 and the curved surface 120R contact each other in the comparative example of FIG. 15B. This increases the distance over which the memory holder 70 moves autonomously. By increasing the distance over which the memory holder 70 moves autonomously, the memory holder 70 is moved to the contact position even if the user does not fully perform an operation of attaching a cartridge.

In addition, in the process of attaching the drum cartridge 20 to the main housing 10, the first spring 73 starts moving the memory holder 70 to the contact position before the second spring TS moves the drum shaft 22S and the drum shaft 22S is located at the correct position. Thus, even if the drum shaft 22S of the photosensitive drum 22 is not located at the correct position, the memory holder 70 is moved to the position where the electrical contact surface 36A contacts the electrical contact CR. Further, the memory holder 70 is moved to the contact position without relying on the second spring TS that urges the drum shaft 22S.

The memory holder cover 80 has the third elongated hole 84, and the memory holder 70 has the third boss B3 inserted into the third elongated hole 84. Thus, the third elongated hole 84 allows the memory holder 70 to move in the perpendicular direction.

Further, the first guide G1 of the main housing 10 has the inclined surface 100K at the entrance of the first guide G1 (see FIG. 14A). This suppresses the memory holder 70 and the memory holder cover 80 getting caught in the entrance of the first guide G1 when the drum cartridge 20 is attached to the main housing 10.

Figure 14B:
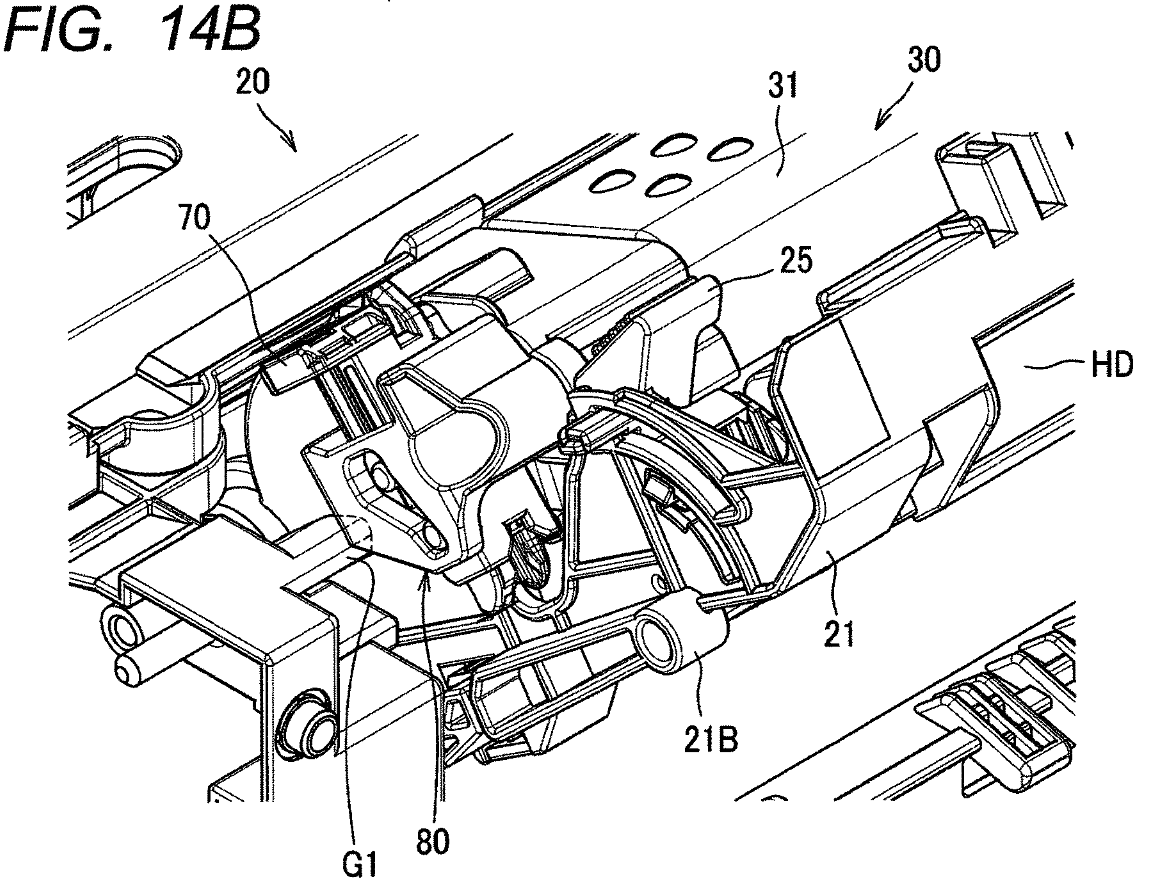
FIG. 14B is a diagram showing a comparative example in which the inclined surface is not provided.

As shown in FIG. 14B, if the first guide G1 does not have the inclined surface 100K, the memory holder 70 and the memory holder cover 80 would easily get caught in the entrance of the first guide G1, and it is difficult to insert the drum cartridge 20.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below:

In the above-described embodiment, the photosensitive drum is provided at the drum cartridge. However, the configuration is not limited to this, and a photosensitive drum may be provided at the main housing. That is, the image forming apparatus of the present disclosure may be any apparatus that forms an image using a photosensitive drum.

In the above-described embodiment, the second spring is a torsion spring, but the second spring may be another spring or an urging member.

In the above-described embodiment, the toner memory 36 for storing information has a configuration that an electrical contact surface and a memory element are provided in an integrated manner, but the electrical contact surface and the memory element are configured separately. In this case, the electrical contact surface may be electrically connected to the memory element via a harness.

In the above-described embodiment, the toner cartridge 30 has the toner memory 36. The present disclosure is not limited to this configuration, and may have a configuration that guides a memory provided at a drum cartridge, for example.

In the above-described embodiment, the present disclosure is applied to a monochrome printer, but the present disclosure is not limited to this. The present disclosure may be applied to other image forming apparatuses such as a color printer, a copier, and a multifunction peripheral (MFP).

The elements described in the above-described embodiment and modifications may be combined arbitrarily and implemented.

What is claimed is:

1. An image forming apparatus comprising:

a main housing;

a cartridge configured to be attached to the main housing in an attaching direction, the cartridge including:

a memory having an electrical contact surface and configured to store information relating to the cartridge;

a memory holder holding the memory; and a memory holder cover holding the memory holder so as to be movable with respect to the memory holder cover; and an electrical contact configured to contact the electrical contact surface from above in a state where the cartridge is located at an attached position at which the cartridge is attached to the main housing, the main housing including a guide groove, the guide groove having an upper guide surface and a lower guide surface, the upper guide surface being configured to guide movement of the memory holder from above when the cartridge is attached and detached, the lower guide surface being configured to guide movement of the memory holder from below when the cartridge is attached and detached, in a state where the cartridge is located at the attached position, the electrical contact surface being parallel to at least part of the upper guide surface or at least part of the lower guide surface.

2. The image forming apparatus according to claim 1, wherein the upper guide surface includes:

a first upper surface extending parallel to the electrical contact surface in a state where the cartridge is located at the attached position; and a second upper surface extending to connect the electrical contact and the first upper surface, the second upper surface being inclined relative to the first upper surface so as to approach the electrical contact from the first upper surface.

3. The image forming apparatus according to claim 2, wherein the lower guide surface includes:

a first lower surface extending parallel to the electrical contact surface in a state where the cartridge is located at the attached position;

a second lower surface inclined relative to the first lower surface so as to approach the electrical contact toward a downstream side in the attaching direction from the first lower surface; and a third lower surface inclined relative to the second lower surface so as to be away from the electrical contact toward the downstream side in the attaching direction from the second lower surface.

4. The image forming apparatus according to claim 3, wherein the memory holder includes:

a first holder holding the memory;

a second holder slidable relative to the first holder; and a first spring located between the first holder and the second holder, the first spring being configured to urge the first holder and the second holder to be away from each other; and wherein, in a process where the cartridge is attached to the main housing, when the first holder contacts the second upper surface and the second holder contacts the third lower surface, the memory holder moves toward a position where the electrical contact surface contacts the electrical contact due to an urging force of the first spring.

5. The image forming apparatus according to claim 4, wherein the cartridge includes a photosensitive drum extending in an axial direction perpendicular to the attaching direction;

wherein the main housing further includes a second spring configured to position a shaft of the photosensitive drum at a correct position in a state where the cartridge is located at the attached position; and wherein, in a process where the cartridge is attached to the main housing, before the second spring moves the shaft of the photosensitive drum and the shaft is located at the correct position, the first spring starts moving the memory holder toward the position where the electrical contact surface contacts the electrical contact.

6. The image forming apparatus according to claim 5, wherein the main housing includes an upper guide having the upper guide surface; and wherein the upper guide has an inclined surface at an entrance of the guide groove, the inclined surface being inclined to be located toward one side in the axial direction toward a direction in which the cartridge is detached.

7. The image forming apparatus according to claim 6, wherein the cartridge is separable into a first cartridge including the photosensitive drum and a second cartridge including a toner housing configured to contain toner; and wherein the memory is located at the second cartridge.

8. The image forming apparatus according to claim 1, wherein the memory holder cover holds the memory holder so as to be movable with respect to the memory holder cover in a perpendicular direction perpendicular to the attaching direction.

9. The image forming apparatus according to claim 8, wherein the memory holder cover has an elongated hole that is long in the perpendicular direction; and wherein the memory holder includes a boss inserted in the elongated hole.

10. The image forming apparatus according to claim 1, wherein the cartridge includes a toner housing configured to contain toner.

11. The image forming apparatus according to claim 1, wherein the cartridge includes a cartridge housing;

wherein the memory holder cover is directly or indirectly fixed to the cartridge housing; and wherein the memory holder is movable relative to the cartridge housing and the memory holder cover.

12. An image forming apparatus to which a cartridge is attachable in an attaching direction, the cartridge including a memory having an electrical contact surface and configured to store information relating to the cartridge, and a memory holder holding the memory and being movable with respect to the cartridge, the image forming apparatus comprising:

a main housing; and an electrical contact configured to contact the electrical contact surface from above in a state where the cartridge is located at an attached position at which the cartridge is attached to the main housing, the main housing including a guide groove, the guide groove having an upper guide surface and a lower guide surface, the upper guide surface being configured to guide movement of the memory holder from above when the cartridge is attached and detached, the lower guide surface being configured to guide movement of the memory holder from below when the cartridge is attached and detached, in a state where the cartridge is located at the attached position, the electrical contact surface being parallel to at least part of the upper guide surface or at least part of the lower guide surface.

13. The image forming apparatus according to claim 12, wherein the upper guide surface includes:

a first upper surface extending parallel to the electrical contact surface in a state where the cartridge is located at the attached position; and a second upper surface extending to connect the electrical contact and the first upper surface, the second upper surface being inclined relative to the first upper surface so as to approach the electrical contact from the first upper surface.

14. The image forming apparatus according to claim 13, wherein the lower guide surface includes:

a first lower surface extending parallel to the electrical contact surface in a state where the cartridge is located at the attached position;

a second lower surface inclined relative to the first lower surface so as to approach the electrical contact toward a downstream side in the attaching direction from the first lower surface; and a third lower surface inclined relative to the second lower surface so as to be away from the electrical contact toward the downstream side in the attaching direction from the second lower surface.

* * * * *